Aug. 16, 1949.　　　E. B. POLLARD ET AL　　　2,479,510
STALK CUTTER
Filed Oct. 20, 1947　　　　　　　　　　　　4 Sheets-Sheet 1

Inventors
ERNEST B. POLLARD.
THEODORE J. BORCHARDT
By Williamson & Williamson
Attorney

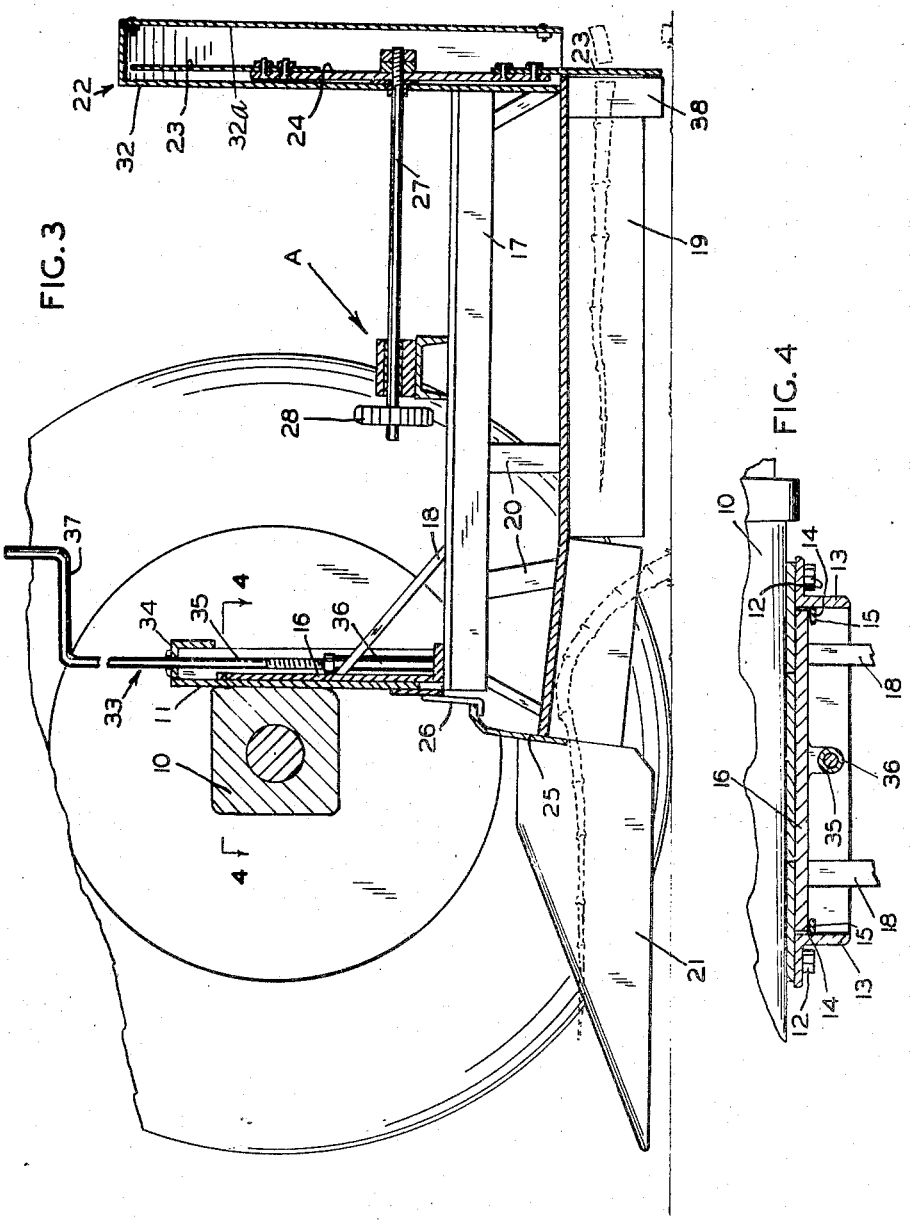

Aug. 16, 1949.  E. B. POLLARD ET AL  2,479,510
STALK CUTTER
Filed Oct. 20, 1947  4 Sheets-Sheet 3
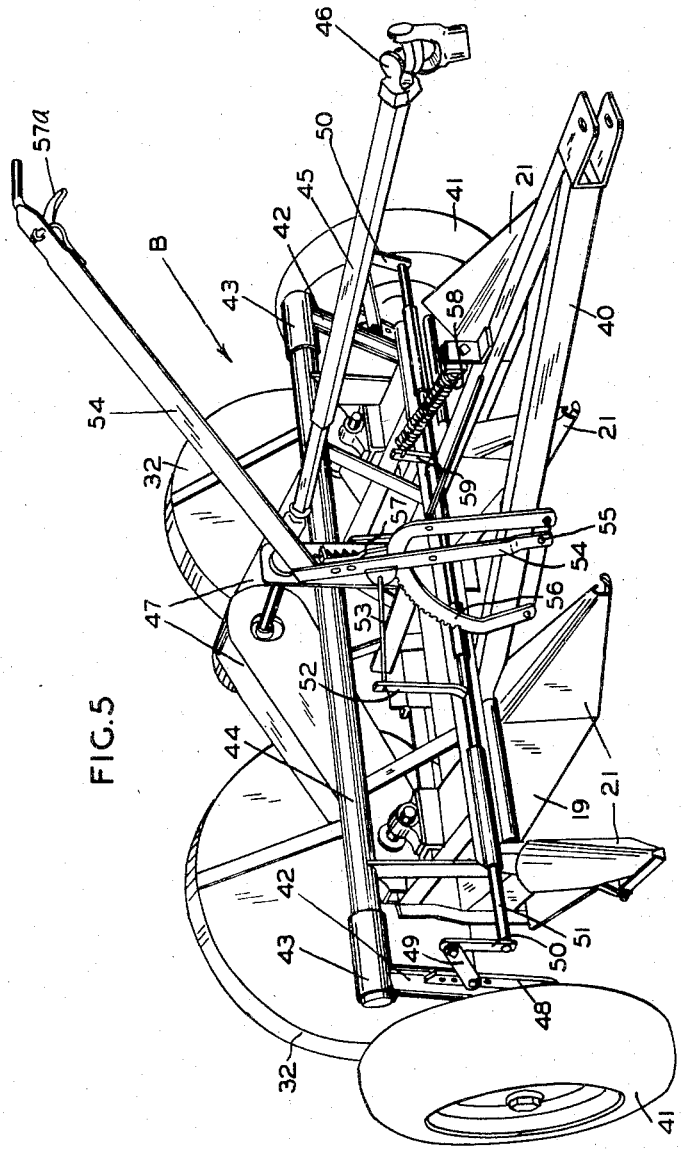
Inventors
ERNEST B. POLLARD
THEODORE J. BORCHARDT
By Williamson & Williamson
Attorneys

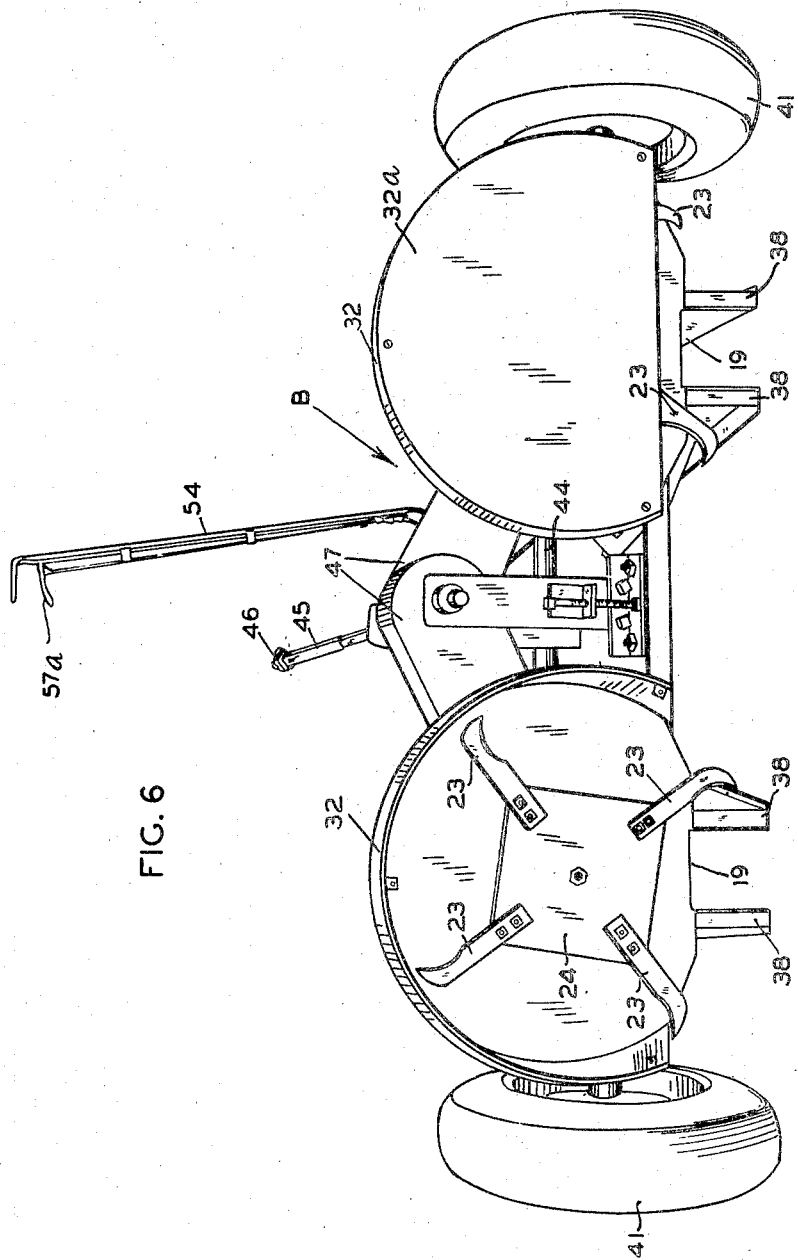

Patented Aug. 16, 1949

2,479,510

UNITED STATES PATENT OFFICE 2,479,510

STALK CUTTER

Ernest B. Pollard and Theodore J. Borchardt, Welcome, Minn.

Application October 20, 1947, Serial No. 780,910

8 Claims. (Cl. 55—61)

This invention relates to a machine or unit for disintegrating or comminuting standing crop stalks in the field and for scattering the particles formed.

In row crops, such as corn and cotton, harvesting is accomplished by picking the matured product from the standing stalks. The harvesters used are mounted on vehicles and leave most of the stalks standing with the leaves and branches thereon, after harvesting. These stalks remain in the ground usually, until fall or spring planting when attempt is made to plow the stalks under. While considerable of the stalks may be plowed under, this operation is generally unsuccessful, leaving portions of the stalk exposed or above the surface of the soil.

Various insects, such as weevils, infests the exposed portions of the stalk and deposit larvae therein which hatch during the next crop season, causing very serious damage to the next crops. The menace of infestation is a very serious one to growers of cotton, corn and other products.

It is an object of our invention to provide a simple and highly efficient unit which may be attached to a tractor or other farm vehicle and supported or drawn thereby or which may be embodied in a separate vehicle to operate upon one or more rows of harvested stalks standing in the field and to very finely disintegrate the same by cutting or slicing action and to further disperse and scatter the fragments behind the vehicle on which the unit is mounted.

Another object is the provision of a stalk-disintegrating unit for row crops which, through travel of a vehicle over the ground, along one or more rows, first bends the stalks forwardly close to the ground, then engages the same and guides the bent stalks longitudinally of the machine into a power operated cutter or slicing mechanism which slices the stalks, branches and leaves into fine fragments and scatters the same rearwardly of the associated vehicle.

It is a further object to provide a stalk-disintegrator of the class described wherein one or more of said cutting units may be easily adjusted vertically of the vehicle or other support therefor and wherein simple, efficient provision is made for driving the cutter mechanism at high speed from a power take-off or driving medium furnished by the vehicle.

A further and related object is the provision of a machine or unit of the type described wherein the stalks, branches and leaves of row crops are progressively and rapidly cut into small fragments of such size as to be readily plowed below the surface of the soil and wherein, after disintegration of the stalks, the particles are scattered in a cloud behind the machine.

These and other objects and advantages of our invention will be more apparent from the following description made in connection with the accompanying drawings wherein like reference characters refer to similar parts throughout the several views and in which:

Figure 3 is a longitudinal vertical sectional view taken substantially along the line 3—3 of Figure 2;

Figure 4 is a horizontal sectional view taken substantially along the line 4—4 of Figure 3;

Figure 5 is a front perspective view of an alternative form of our stalk disintegrator; and, Figure 6 is a rear perspective view of the structure shown in Figure 5.

Figure 1:
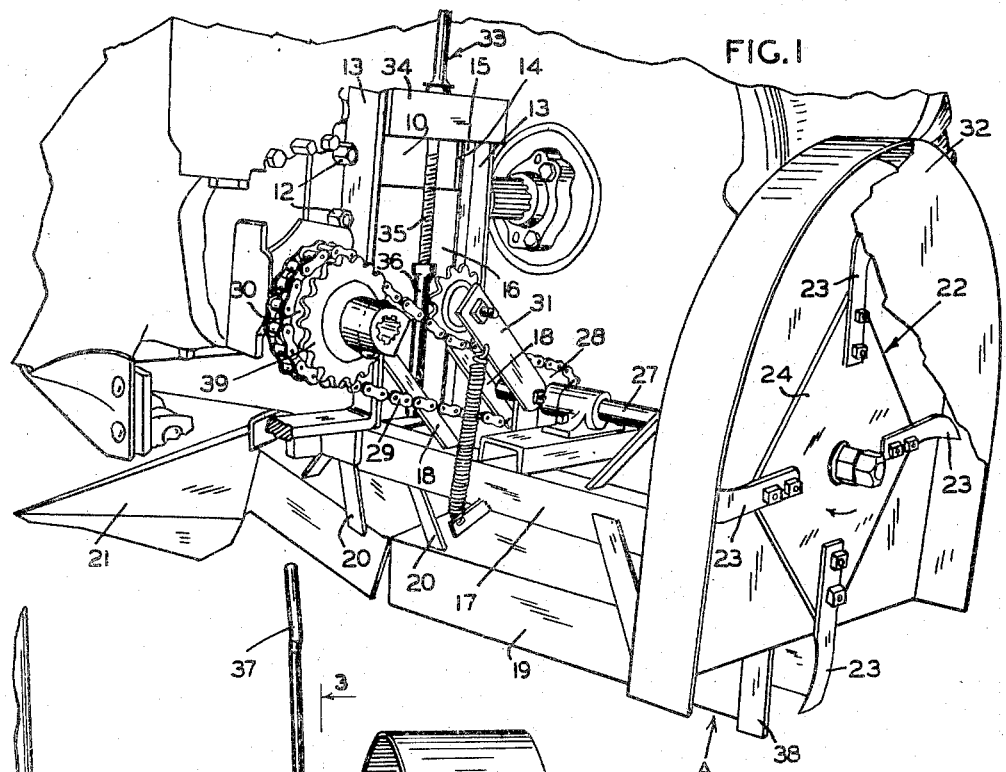
Figure 1 is a side perspective view showing one form of our stalk disintegrator as mounted on a tractor.
Figure 2:
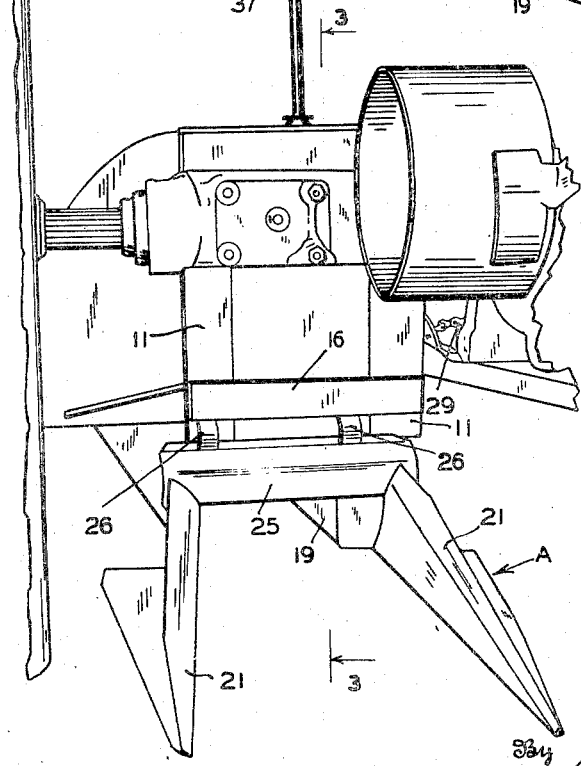
Figure 2 is a front perspective view of the form of our invention illustrated in Figure 1.

In Figures 1 through 4, we show one form of our stalk disintegrator machine. This form will be designated by the letter A and is adapted to be attached in a single unit directly to the rear axle housing of a tractor. In said figures 1 through 4, a portion of a conventional farm tractor is illustrated having a rear axle housing 10 with a pair of spaced vertically disposed heavy straps 11 fixed as by welding to the rear side of said housing. Each of these straps 11 is equipped with a pair of outstanding threaded studs 12 to which a pair of spaced angles 13 are adapted to be secured by a nut being threadably engaged on each of said studs 12 to hold said angles 13 in vertically disposed spaced parallel relation, the free legs of said angles outstanding from said axle housing 10 in opposed relation to each other. A slide 14 is formed on the inner opposed leg of each of said angles 13 as by welding a pair of strips 15 respectively thereto. A vertical carriage 16 is slidably mounted in said slides 14 for vertical movement therein. A supporting frame 17 is fixed to the lower portion of said vertical carriage 16 as by being welded thereto and diagonal struts 18 are provided to strengthen this connection. The frame 17 extends horizontally and rearwardly of said carriage 16 and is disposed substantially longitudinally of the tractor.

A stalk engaging guide in the general form of an inverted channel 19 having a pair of spaced longitudinally disposed parallel sides is fixed to said frame 17 as by the attachment bars 20 and extends there below. A pair of diverging stalk engaging shoes 21 are fixed at the forward end of said inverted channel 19. These shoes 21 diverge toward the forward ends thereof and converge at the rear ends thereof to guide the stalks into the channel 19. A stalk bending member such as the transverse bar 25 is mounted across the forward end of the inverted channel 19 between said diverging shoes 21 and said channel 19. The forward end of the channel 19 is disposed slightly above the rear portion thereof and slopes downwardly from the front as shown in Figure 1. A suitable brace 26 is provided between said carriage 16 and said bending member 25 to securely hold said bar 25 in place.

A power-driven cutter mechanism is provided at the rear of said inverted channel 19 and in the form of our invention illustrated in the accompanying drawings, includes a rotary head 24 with slicer elements such as the blades 23 operated by said head 24 and removeably mounted thereon. The slicer elements follow a path which is disposed transversely to the guided stalks and to the line of travel of the tractor. In the form of cutter illustrated these blades 23 follow a high speed rotary path, the lower portion of which passes across the rear end of inverted channel 19 to transversely slice the stalks as the machine passes over them. However, it is conceivable that these slicer elements could be reciprocated back and forth across the rear end of said channel 19 or that some other cutting action could be used and we are in no way limiting ourselves to a rotary cutter. A protective cover 32 having a removable back plate 32a completely surrounds the cutter blades 23 and head 24 except for the extreme bottom portion thereof, the blades 23 extending a short distance below said cover 32 at the bottom of their rotary path.

In the form of cutter mechanism illustrated, the rotary head 24 of the cutter 22 is fixed to a power-driven shaft 27 which is journaled in suitable bearings and extends forwardly of said head 24. A sprocket wheel 28 is fixed at the forward end of said shaft 27 and chain 29 is trained thereon and is also trained over a second sprocket wheel 30 of larger diameter which is driven directly by the power take-off of the tractor. A suitable resilient belt tightener 31 is provided to maintain the desired tension in said chain 29.

The clearance between the ground and the stalk engaging elements of our machine consisting of the forwardly diverging shoes 21, inverted channel 19, and lower extremities of the cutter blades 23 can be adjusted by a single vertical adjustment mechanism 33. An angle bar 34 is fixed transversely across the top portions of the vertically disposed spaced angles 13 and has an aperture through the central horizontal portion thereof. An externally threaded adjustment rod 35 is mounted through said aperture for rotation on a vertical axis and is provided with a pair of collars fixed to said rod 35 and slidably mounted on opposite sides of the horizontally disposed leg of said angle bar 34 surrounding the aperture therein through which said rod 35 extends. An internally threaded sleeve 36 is fixed to the rear face of carriage 16 and is adapted to threadably receive the externally threaded adjustment rod 35. A suitable crank handle 37 is provided at the top of rod 35 to rotate the same and thereby adjust the height of said carriage 16 and the clearance between the ground and the above-mentioned stalk engaging elements of our mechanism.

From the foregoing description, it is apparent that our invention includes a new method of slicing standing stalks in a row which consists in first progressively bending a row of stalks forwardly and then retaining said stalks in forwardly bent position adjacent the ground and lying in substantial alignment with the row and then progressively cutting said stalks so held, into finely comminuted segments while simultaneously advancing the progressive bending and guiding of other stalks in the row. The method more specifically includes in the cutting or disintegrating step the progressive slicing of the stalks from the or bent or root-attached ends towards the outer or free ends of the stalks.

Operation

The following is a description of the operation of form A of our invention. The height of the stalk engaging elements is initially adjusted to maintain the optimum clearance between said elements and the ground. This adjustment is made by turning the crank 37 to screw the carriage 16 up or down; the frame 17 and the stalk engaging elements being mounted on said carriage 16, move up and down therewith. When the proper adjustment has been made the tractor is driven across a field from which a crop which leaves a stalk standing such as corn or cotton has been picked.

A row of stalks is longitudinally aligned with the inverted channel 19 and the diverging shoes 21 guide the stalks into said channel 19 as the machine progresses along the row. The stalk bending member 25 engages the stalks at a point slightly above the ground and bends the same forwardly. The inverted channel 19 passes forwardly over the bent stalks to guide them rearwardly butt-end first back to the slicer mechanism 22. By using a large sprocket wheel 30 on the power take-off shaft and a small sprocket wheel 28 on the drive shaft 27, the rotary stalk slicer illustrated can be driven at a relatively high speed of between 700 and 1,000 revolutions per minute.

As the stalks are engaged by the cutter blades, they are transversely sliced into finely comminuted fragments. The butt-ends of the stalks are initially sliced to cut the stalks, with their branches and leaves thereon, free from the ground and their roots. Thereafter the machine passes over the cut stalks and the inverted channel 19 continues its guiding function to confine the stalks and hold the same transversely to the path of the cutter blades and to feed said stalks into said blades. The cutter blades then disintegrate the stalks, branches and leaves into finely comminuted fragments which are spread over the ground by the motion imparted to them by the cutter blades which also act as spreaders.

The optimum adjustment of the cutter blades relative to the ground is to place them so that they just engage the top of the hills in which the stalks are growing, whereby the best operation of the machine is obtained. If the cutter blades extend too deeply into the ground, the added resistance will slow them up and if they do not engage the ground, the cutting efficiency of stalks which are lying on the ground surface is materially reduced.

It should be noted that the rear extremities of the depending flanges of inverted channel 19 are reinforced with heavy straps 38 fixed to the outer surface thereof as by welding. The cutting edge of the slicer blades 23 is slightly concaved in shape and will have a shearing effect on the stalks against the inner rear edge of the side of channel 19 in addition to the cutting action of said blades 23. The blades 23 are disposed in very slightly spaced relation to the rear extremity of channel 19 so that it is obvious that there will be this shearing action although it is not in any way necessary to the successful operation as the blades 23 will slice most of the stalks before they reach the side of the channel 19.

As best shown in Figure 1, a second driving sprocket wheel 39 is fixed to the power take-off of the tractor and is adapted to have a second driving chain trained thereon to drive a similar stalk disintegrator unit (not shown) which can be mounted on the other side of the tractor axle 10 in spaced parallel relation to the previously described unit, the spacing between the units being equal to the spacing between the stalk rows. This will permit two rows of stalks to be comminuted simultaneously each time the tractor is driven across the field.

As illustrated in Figures 5 and 6, we show an alternative form, designated by letter B, of our invention which comprises a wheeled trailer unit having a draw-bar 40 adapted to be attached at the rear of a tractor and the wheels 41 mounted at the bottom of depending struts 42. The upper ends of the struts 42 are fixed respectively to a pair of sleeves 43 which are respectively slidably inserted over the outer ends of a transverse supporting frame member 44 which takes the form of a steel tubular member as illustrated in Figure 5. Any suitable means are provided for preventing the sleeves 43 from being displaced laterally.

A pair of stalk disintegrator units are mounted below said frame 44 and are fixed thereto by suitable brackets. The spacing between these units is equal to the spacing between the rows of stalks in the field. A machine illustrated in Figures 5 and 6 shows a pair of units but it is entirely conceivable that four or even five disintegrator units could be mounted in side by side relation so that a corresponding number of stalk rows could be disintegrated simultaneously. The disintegrator units illustrated in form B of our invention are identically similar to the disintegrator unit described for form A of our invention and have a rotary slicer transversely mounted at the rear of each of said units. A power take-off connection 45 is adapted to be connected to the tractor and extends rearwardly therefrom through a universal joint 46 to drive suitable sprocket wheels which are connected with their respective slicer elements as by a chain and sprocket drive. Covers 47 completely enclose the chain of sprocket driving connections. The height of the stalk engaging elements of the disintegrator units relative to the ground can be adjusted by an adjustment mechanism. The pivotally mounted struts 42 have a bracket 48 fixed in vertical position at the forward portion thereof. The upper portion of bracket 48 has a plurality of spaced adjustment apertures therethrough. A link 49 connects each bracket 48 with rocker arms 50 fixed to a transversely disposed rock shaft 51 which is journaled in suitable bearings in said frame. A shaft oscillating arm 52 is also fixed to shaft 51 and has a control link 53 connecting it with a control lever 54 which is pivotally mounted on the draw-bar 40 as by the fulcrum pin 55. The upper portion of lever 54 is bent forwardly to enable the tractor operator to control same. A notched segment 56 is fixed to draw-bar 40 and extends upwardly therefrom. A releasable spring-pressed dog 57 is provided to engage a selected notch in segment 56 and a dog releasing control 57a is mounted at the forward end of handle 54 to enable the operator to release the dog and swing the handle to the desired position. A counter balance spring 58 is fastened to the draw-bar 40 at the other end to aid in raising the disintegrator unit off the ground.

By raising the forward end of control lever 54 on its pivot pin 55 after the spring pressed dog 57 has been released, the wheels 41 and struts 42 are allowed to swing rearwardly with sleeves 43 rotating on transverse tubular frame 44. This will lower the disintegrating unit including the cutter blades toward the ground surface. The weight of the machine will aid in lowering the disintegrator mechanism against the counterbalancing force of spring 58. By connecting the link 49 in a higher aperture through bracket 48, it will be seen that the distance that the strut 42 will be moved by the same movement of lever 54 will be increased. In other words, the adjustment of link 49 controls the sensitivity of the control lever 54 which is shown in extreme forward position thus raising the disintegrating mechanism to its maximum height off the ground. The spring 59 counterbalances the weight of the machine in raising the same and also takes some of the force off of the dog 57 in aiding to hold the machine in raised position.

The operation of the disintegrating units for form B of our invention is identical to that described for form A.

It will be seen that we have provided a simple and highly efficient disintegrator unit which will comminute the grain stalks, leaves and branches into fine fragments and scatter the same rearwardly thereof. These fragments are extremely small in size due to the high speed rotation of the cutter blades and hence can be readily plowed under the surface of the soil and prevent infestation of the stalks, leaves and branches by insects such as weevils which are a menace to cotton and corn growers as well as growers of other products throughout our country.

It will, of course, be understood that various changes may be made in the form, details, arrangement and proportions of the parts without departing from the scope of our invention.

What we claim is:

1. A stalk cutter including a wheel-supported frame for traversing the earth longitudinally of at least two rows of stalks, spaced apart rotatable cutters each including a driving shaft mounted on said frame, a common driving means for said cutters mounted on the frame substantially intermediate of and above the shafts thereof, driving connections on the cutter shafts and individual driving connections between the common driving means and the respective driving connections on the shafts, stalk bending and guiding means rigidly connected to the frame for bending and guiding the stalks into the path of the cutters, means for rotating the said common driving means, and raising and lowering means on the frame for raising and lowering the same relative to the ground, whereby operation of said means simultaneously adjusts the height of the frame, the cutters and the stalk bending and guiding means with respect to the ground over which the frame passes.

2. A stalk cutter and disintegrator as defined in and by claim 1 wherein the cutters rotate on a horizontal axis and wherein a vertically disposed open ended housing is rigidly connected to said frame, said housing encompassing said cutters with the open end thereof facing rearwardly of the cutters, and bracing means are secured to and extend between the housing and the frame.

3. A stalk disintegrator and spreader for row crops including a wheel-supported frame adapted for draft attachment to a tractor provided with a power take-off, raising and lowering means on the frame for raising and lowering the frame relative to the ground, a rigidly interconnected stalk disintegrating and spreading unit comprising spaced, diverging, rigid stalk gathering means connected to and extending forwardly of the frame, rigid horizontally disposed stalk bending means at the forward portion of the frame, adjacent the inner converging portions of the stalk gathering means, spaced stalk guiding and feeding means rigidly connected to the frame and a stalk cutting mechanism rigidly mounted on the frame adjacent the outlet end of the guiding and feeding means, and means adapted for connection to the power take-off of the tractor for actuating the cutting mechanism whereby when the frame moves longitudinally of a row of stalks the same are gathered by the gathering means, bent, guided and fed at a substantially horizontal position to the cutting mechanism and the successively presented stalks are progressively disintegrated and spread over the ground, and when raising and lowering means is operated, the height of the frame and the unit carried thereby is adjusted relative to the ground over which the frame passes.

4. A stalk disintegrator and spreader as defined in and by claim 3 wherein the frame includes pivotally mounted wheel-supporting struts, and wherein a horizontally disposed rock shaft is mounted on the frame, bell crank linkage is interconnected between the respective ends of the rock shaft and the respective wheel-supporting struts, and manually operable means mounted on the frame for rotating the rock shaft to shift the said struts, thereby altering the height of the frame relative to the ground.

5. A stalk disintegrator and spreader for row crops including a wheel-supported frame having a horizontal extent greater than at least two rows of stalks and adapted for draft connection to a tractor provided with a power take-off, raising and lowering means on said frame for adjusting the height thereof relative to the ground, horizontally spaced, rigidly interconnected, stalk disintegrating and spreading units mounted on the frame, said units being spaced apart the distance between two rows of stalks and each including spaced diverging stalk gathering elements extending forwardly of the frame, rigid horizontally disposed stalk bending means at the forward portion of the frame adjacent the inner converging portions of the stalk gathering elements, stalk guiding and feeding means rigidly connected to the frame, and a stalk cutting mechanism fixedly supported by the frame adjacent the outlet end of the guiding and feeding means, a common driving shaft having driving means at one end adapted for connection with the power take-off of said tractor, and plural driving means at the other end thereof, each of the stalk cutting mechanisms including a cutter shaft, and driving connections extending respectively between the plural driving means on the said first mentioned shaft, and each of the cutter shafts, to actuate the latter when the first mentioned shaft is driven, whereby when the raising and lowering means is actuated the height of the frame and the units carried thereby is adjusted relative to the ground over which the frame passes.

6. A stalk disintegrator and spreader for row crops having in combination a wheel-supported mobile frame adapted to travel over the ground, raising and lowering means on the frame for raising and lowering the same relative to the ground, a supporting structure secured to said frame and supported thereby in a fixed determined ground-overhanging relation, stalk-gathering confining and feeding means rigidly interconnected and rigidly secured to the lower portion of said supporting structure and extending longitudinally of the line of travel of said frame, said means including a pair of forwardly diverging gathering elements, a pair of spaced substantially vertical guiding and feeding elements receiving from said gathering elements and a top, stalk-confining and feeding element fixed above said vertical guiding elements, a rigid horizontal stalk bending element fixed to said supporting structure and disposed adjacent and above the forward ends of said vertical guiding and feeding elements, and power stalk-cutting mechanism also immovably secured to said supporting structure and mounted at the rear and outlet end of said stalk-confining and feeding means whereby when said mobile frame is moved longitudinally of a row of stalks, the same are gathered by said diverging elements, bent by said bending member, guided and fed into a substantially straight horizontal position to the cutting mechanism and then progressively disintegrated and spread over the ground and when the raising and lowering means is operated, the height of the frame and thereby the supporting structure and the stalk gathering, bending, confining and feeding and cutting means carried thereon is adjusted relative to the ground.

7. A stalk disintegrator and spreader for row crops having in combination a wheel-supported mobile frame adapted to travel over the ground longitudinally of a row of cut crops, raising and lowering means on said frame for raising and lowering the same relative to the ground, stalk-gathering, confining and feeding means rigidly secured to the lower portion of said frame and extending longitudinally of the line of travel thereof, said means including an inverted, rigid U-shaped channel member rigidly mounted on said frame and in close relation to the ground, and rigid, spaced, forwardly diverging gathering elements at the forward end thereof, a rigid horizontally disposed stalk-bending element rigidly attached to the frame at the upper and forward end of said channel member, and cutting mechanism immovably secured to said frame and including cutter elements working transversely of the end of said stalk-confining and feeding mechanism, and whereby when said raising and lowering means is actuated, the height of the frame and the stalk gathering, confining and feeding and cutting means carried thereon is altered relative to the ground over which the frame passes.

8. A stalk cutter having in combination a wheeled mobile carrier for traversing the ground longitudinally of at least two rows of stalks and including a ground-overhanging supporting frame, raising and lowering means mounted on the frame for adjusting the height thereof, a pair of spaced substantially parallel stalk-gathering, confining and feeding and cutting units rigidly secured to said frame and depending therefrom and extending longitudinally of said carrier, said units each including an inverted U-shaped channel member disposable in close relation to the ground, and spaced, rigid, forwardly extending gathering elements at the forward end thereof and each unit further including a rigid horizontal stalk-bending element attached to said frame, a pair of spaced power stalk cutting mechanisms immovably secured to said frame and each mounted directly behind one of the inverted U-shaped stalk confining and feeding members, a common driving means mounted on said frame and driving connections between said driving means and each of said cutter mechanisms and whereby when said raising and lowering means is operated, the height of said frame and the stalk-gathering, confining and cutting and feeding units immovably fixed thereto is vertically and fixedly adjusted relative to ground level.

ERNEST B. POLLARD.
THEODORE J. BORCHARDT.

REFERENCES CITED

The following references are of record in the file of this patent:

UNITED STATES PATENTS

| Number | Name | Date |
|---|---|---|
| 349,822 | Stafford | Sept. 28, 1886 |
| 370,616 | Gilpin | Sept. 27, 1887 |
| 585,791 | Rudy | July 6, 1897 |
| 657,411 | Hamm | Sept. 4, 1900 |
| 988,844 | Wilson | Apr. 4, 1911 |
| 1,059,404 | Spiva | Apr. 22, 1913 |
| 1,619,797 | Martikainen | Mar. 1, 1927 |
| 1,676,172 | Warner | July 3, 1928 |
| 1,698,724 | Johnston et al. | Jan. 15, 1929 |
| 2,048,196 | Phillips | July 21, 1936 |
| 2,279,652 | Beard | Apr. 14, 1942 |
| 2,302,973 | Sargent | Nov. 24, 1942 |